United States Patent Office 3,146,215
Patented Aug. 25, 1964

3,146,215
RUBBERY COPOLYMER OF A MONOVINYL ETHER AND AN ALKYL ESTER AND VULCANIZATES THEREOF
George B. Sterling and Robert L. Zimmerman, Midland, Mich., assignors to The Dow Chemical Company, Midland, Mich., a corporation of Delaware
No Drawing. Filed Nov. 3, 1960, Ser. No. 66,898
5 Claims. (Cl. 260—41)

This invention relates to compositions of matter comprising rubbery copolymers and vulcanizates thereof. More particularly, this invention is concerned with copolymers of monovinyl ethers of glycols and esters of acrylic and methacrylic acids and to vulcanized compositions thereof.

It is known that rubbery copolymers can be made by the copolymerization of various monomers such as styrene with butadiene, acrylonitrile with butadiene, and isobutylene with butene. As the search continues for monomers and combinations of monomers which will produce rubbery material when subjected to polymerization, it has been found that many monomers produce inflexible resinous products and that elastomeric materials are difficult to produce. In addition, known rubbery polymers contain residual unsaturation to which is attributed their susceptibility to oxidative attack.

It is among the objects of the present invention to provide a new rubbery composition of matter. A further object of the present invention is the provision of a vulcanized product suitable for use in place of vulcanized natural rubber. Another object of the present invention is the provision of a novel reinforced elastomeric composition. A further object of the present invention is to produce elastomeric compositions which are free of residual unsaturation. These and other objects are attained in accordance with the practice of the present invention as will appear from the following description.

It has now been discovered, and the discovery forms the basis of the invention, that elastomeric compositions can be produced by copolymerizing the monovinyl ether of a glycol with an ester of acrylic or methacrylic acid. The resulting rubbery copolymers can be compounded with reinforcing agents and cured to produce vulcanized rubbers of superior quality.

The monovinyl ethers suitable for the production of copolymers and vulcanizates of the present invention are the monovinyl ethers of glycols and are represented by the general formula $HO-(C_nH_{2n}O-)_xCH=CH_2$ in which $n$ is a positive integer from 2 to 4 and in which $x$ is a positive integer from 1 to 3. Representative examples of such compounds are the monovinyl ether of ethylene glycol, the monovinyl ether of trimethylene glycol, the monovinyl ether of propylene glycol, the monovinyl ethers of butylene glycols, the monovinyl ether of diethylene glycol, the monovinyl ether of tripropylene glycol and the monovinyl ether of dibutylene glycol.

The monomers copolymerizable with the monovinyl ethers to prepare the elastomers of the present invention are alkyl esters of acrylic and methacrylic acids. The alkyl portion of the esters employed to produce the copolymers of the present invention can have from 1 to about 8 carbon atoms. Representative specific examples of such copolymerizable monomers are the methyl ester of acrylic acid, the ethyl ester of acrylic acid, the propyl ester of methacrylic acid, the butyl esters of methacrylic acid, the cyclohexyl ester of acrylic acid, the methyl ester of methacrylic acid, and the 2-ethylhexyl ester of acrylic acid.

The new copolymers can be produced by emulsion, mass or solution polymerization or by any of the other usual polymerization techniques. Advantageously the copolymers of the present invention are produced by copolymerizing the monomeric materials in a confined zone in the presence of suitable catalysts such as free radical catalysts. The materials are preferably agitated slowly and maintained at elevated temperatures during the polymerization reaction.

It is found that rubbery copolymers can be produced which contain in copolymerized form between about 10 percent and about 60 percent by weight of the ester and between about 40 percent and about 90 percent by weight of the monovinyl ether. Good elastomeric materials are provided by polymers containing in the polymer molecule between about 30 percent and about 50 percent by weight of the ester and between about 50 percent and about 70 percent by weight of the monovinyl ether.

The copolymers of the present invention can be vulcanized by compounding the copolymers with vulcanizing agents and subjecting the compounded materials to curing conditions. For example, the crude rubbery material can be compounded with vulcanizing agents such as sulfur, sulfur chloride and aniline butyroaldehyde. When the crude rubbery material is to be converted into vulcanized products, it is highly desirable that the crude material be compounded with a reinforcing filler since it is found that such fillers substantially increase the tensile strength and improve other physical properties of the vulcanizate. Representative examples of reinforcing fillers are the various carbon blacks including lamp black, channel black, furnace black and the like, zinc oxide and kaolin. It is desirable to employ an accelerator in the compounding as an accelerator substantially reduces the amount of time required to carry out the vulcanization. Representative examples of accelerators suitable for use in producing the vulcanizates of the present invention are benzothiazolyl disulfide, 2-mercaptobenzothiazole, 1,3-diphenylguanidine, and zinc dimethyldithiocarbamate. Advantageously, the crude rubber is also compounded with an activator to initiate the vulcanization reaction. Among the activators suitable for use in compounding with the herein described copolymers to produce the vulcanized products of the present invention are zinc oxide, lead oxide, magnesium oxide and stearic acid.

The compounding of the crude rubber can be done by malaxing, kneading, milling or otherwise intimately blending the crude rubber of this invention with the compounding ingredients in the desired proportions as by compounding the materials with one another in an internal mixer such as a plastics extruder or a Banbury mixer or on an external mixer such as an open-faced roll mill to form a homogeneous composition.

The following examples are illustrative of the present invention but the invention is not limited to the specific details thereof. All parts and percentages are parts and percentages by weight unless otherwise specified.

*Example I*

There are placed in a 12-ounce citrate bottle 80 grams of the monovinyl ether of diethylene glycol, 20 grams of ethyl acrylate, 5 grams of lauroyl peroxide and 5 grams of α,α'-azobis(isobutyronitrile), the latter two materials acting as catalysts. The bottle is then flushed with nitrogen, capped and clamped into a tumbler-type washing machine. The machine is operated at 40 rotations per minute and kept at a temperature of 60° C. for 30 hours. The bottle is removed from the machine and broken to obtain the contents which is a gel of polymer and monomer. The polymer is devolatilized by heating for 10 hours at a temperature of 100° C. and at a pressure of 10 mm. of mercury. There is obtained 42 grams of crude rubbery copolymer containing in polymerized form 40.5 percent of ethyl acrylate and 59.5 percent of the monovinyl ether of diethylene glycol.

Forty parts of the crude rubbery copolymer is fed onto a cold two-roll mill. There are then compounded with the polymer on the mill for 15 minutes 16 parts of furnace black, 2 parts of zinc oxide, 8 parts of sulfur and 1.2 parts of benzothiazolyl disulfide, an accelerator. The homogeneous mixture is then placed in a mold and cured at 145° C. and 1000 p.s.i. for 50 minutes. The cured product when tested in the manner described in A.S.T.M. D-412-51T exhibits an elongation of 40 percent, a tensile strength of 290 pounds per square inch, and a permanent set of zero. When tested in accordance with A.S.T.M. D-676-55T the material is found to possess a Shore A hardness of 51 and a Shore C hardness of 14.

*Example II*

In a manner similar to that described in Example I 22.8 grams of ethyl methacrylate are substituted for the alkyl ester there employed to obtain a crude rubbery copolymer similar to that otbained in Example I. This copolymer can be compounded with the materials set forth in Example I and cured in a like manner to obtain vulcanizates having properties similar to those obtained in Example I.

In a manner similar to the foregoing examples each of the monovinyl ethers within the class above defined and mixtures thereof are copolymerizable with each of the esters within the class above defined and mixtures thereof to produce rubbery copolymers which can be compounds with reinforcing fillers and cured to produce vulcanizates having properties similar to those given above.

The new compositions possess good processability and can be compounded in accordance with the standard formulations and according to standard techniques. In addition to the materials given above the herein disclosed copolymers can be compounded with modifying agents, such as peptizers, plasticizers, softeners, retarders, antioxidants, extenders and coloring materials as well as various factices, natural, synthetic and reclaimed rubbers. The compositions are useful for making a variety of rubber articles including sheets, films, gaskets, electrical insulation and the like, by well known techniques such as molding, calendering, and extruding.

As will be appreciated, various modifications can be made within the scope of the present invention without departing from the spirit thereof.

That which is claimed is:

1. A vulcanized synthetic rubber made by compounding together a copolymer of a monovinyl ether represented by the general formula $$HO-(C_nH_{2n}O-)_xCH=CH_2$$

in which $n$ is a positive integer from 2 to 4 and in which $x$ is a positive integer from 1 to 3, and an alkyl ester of an acid selected from the group consisting of acrylic acid and methacrylic acid, the alkyl portion of the ester having up to about 8 carbon atoms, there being present in the copolymer in polymerized form about 40 percent to about 90 percent of the monovinyl ether and about 10 percent to about 60 percent of the alkyl ester, rubber-vulcanizing agents, and a reinforcing filler, and heating the resulting composition at curing temperature until this composition is substantially vulcanized.

2. A vulcanized synthetic rubber according to claim 1 in which the monovinyl ether is the monovinyl ether of diethylene glycol.

3. A vulcanized synthetic rubber according to claim 1 in which the alkyl ester is an alkyl ester of acrylic acid.

4. A vulcanized synthetic rubber according to claim 1 in which the reinforcing filler is carbon black.

5. A vulcanized synthetic rubber made by compounding together a copolymer of the monovinyl ether of diethylene glycol and the ethyl ester of acrylic acid, there being present in the copolymer in polymerized form about 50 percent to about 70 percent of the monovinyl ether and about 30 percent to about 50 percent of the ethyl ester, rubber-vulcanizing agents, and carbon black, and heating the resulting composition at curing temperature until the composition is substantially vulcanized.

References Cited in the file of this patent

UNITED STATES PATENTS

| | | |
|---|---|---|
| 2,016,490 | Fikentscher | Oct. 8, 1935 |
| 2,492,169 | Mast et al. | Dec. 27, 1949 |
| 2,692,256 | Bauer | Oct. 19, 1954 |
| 2,828,220 | McWherter et al. | Mar. 25, 1958 |

FOREIGN PATENTS

| | | |
|---|---|---|
| 378,544 | Great Britain | Aug. 18, 1932 |
| 441,064 | Great Britain | Jan. 9, 1936 |